(12) United States Patent
Bayer et al.

(10) Patent No.: US 11,643,131 B2
(45) Date of Patent: May 9, 2023

(54) STEERING COLUMN FOR A MOTOR VEHICLE

(71) Applicants: thyssenkrupp Presta AG, Eschen (LI); thyssenkrupp AG, Essen (DE)

(72) Inventors: Tim Bayer, Luechingen (CH); Simon Blaettler, Grabs (CH); Daniel Kreutz, Feldkirch (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 17/429,844

(22) PCT Filed: Apr. 23, 2020

(86) PCT No.: PCT/EP2020/061280
§ 371 (c)(1),
(2) Date: Aug. 10, 2021

(87) PCT Pub. No.: WO2020/216819
PCT Pub. Date: Oct. 29, 2020

(65) Prior Publication Data
US 2022/0126906 A1    Apr. 28, 2022

(30) Foreign Application Priority Data

Apr. 24, 2019 (DE) ............ 10 2019 205 861.2

(51) Int. Cl.
*B62D 1/184* (2006.01)
*B62D 1/185* (2006.01)
*B62D 1/181* (2006.01)

(52) U.S. Cl.
CPC ............ *B62D 1/184* (2013.01); *B62D 1/185* (2013.01); *B62D 1/181* (2013.01)

(58) Field of Classification Search
CPC ........ B62D 1/184; B62D 1/185; B62D 1/181; B62D 1/183
See application file for complete search history.

(56) References Cited

U.S. PATENT DOCUMENTS 2,719,688 A * 10/1955 Seifert .................. A47F 7/06
                                                   403/328
4,032,240 A    6/1977 Reinhardt
(Continued)

FOREIGN PATENT DOCUMENTS

CN    2 789 100 Y    5/1996
CN    107207032 A    9/2017
(Continued)

OTHER PUBLICATIONS

English Translation of International Search Report Issued in PCT/EP2020/061280 dated Aug. 11, 2020.
Machine Translation of DE 25 10 062.

*Primary Examiner* — Drew J Brown
(74) *Attorney, Agent, or Firm* — thyssenkrupp North America, LLC (57) ABSTRACT

A steering column may include a casing unit in which a steering spindle is rotatably mounted about a longitudinal axis and which has at least three telescopically guided casing tubes that are mutually adjustable in an axial direction. One of the tubes is an external casing tube in which an intermediate casing tube is received, an internal casing tube being received in the intermediate casing tube. A locking bolt installation can releasably lock at least two of the casing tubes to one another in the direction of the longitudinal axis. The locking bolt installation can switch between an internal blocking position and an external blocking position. The intermediate casing tube in the internal blocking position is
(Continued)

locked to the internal casing tube. The intermediate casing tube in the external locking position is locked to the external casing tube.

10 Claims, 3 Drawing Sheets

(56) References Cited

U.S. PATENT DOCUMENTS

| | | | |
|---|---|---|---|
| 7,819,049 B2 * | 10/2010 | Pastrnak | F42D 5/045 |
| | | | 86/50 |
| 9,275,765 B2 * | 3/2016 | Harkness | G21C 19/105 |
| 2017/0247046 A1 | 8/2017 | Huber et al. | |
| 2018/0050719 A1 | 2/2018 | Agbor et al. | |
| 2019/0031224 A1 | 1/2019 | Huber | |

FOREIGN PATENT DOCUMENTS

| | | | | |
|---|---|---|---|---|
| CN | 107531268 A | | 1/2018 | |
| DE | 25 10 062 A1 | | 10/1976 | |
| DE | 10 2015 216 326 A1 | | 6/2016 | |
| DE | 102020105625 A1 * | | 9/2021 | B62D 1/183 |
| WO | WO-2020007723 A1 * | | 1/2020 | B62D 1/181 |
| WO | WO-2020104608 A1 * | | 5/2020 | B62D 1/181 |

* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2020/061280, filed Apr. 23, 2020, which claims priority to German Patent Application No. DE 10 2019 205 861.2, filed Apr. 24, 2019, the entire contents of both of which are incorporated herein by reference.

FIELD

The present disclosure generally relates to adjustable steering columns.

BACKGROUND

A steering column for a motor vehicle has a steering shaft with a steering spindle, a steering wheel for introducing a steering command by the driver being attached to the end thereof that faces the driver and in the direction of travel is the rear end. The steering spindle is rotatably mounted in the casing unit of an actuator unit which by way of a support unit which holds the casing unit is mounted on the vehicle body.

It is known for the steering column to be designed so as to be adjustable in the longitudinal direction, that is to say in the axial direction of the steering spindle, or in the direction of the longitudinal axis, respectively, so as to in the manual driving operation adapt the steering wheel in the operating position to the driver's position for a comfortable steering intervention. During autonomous driving, when no manual steering intervention takes place, the steering column in the longitudinal direction can be collapsed, or retracted, respectively, as far as possible and thus shortened such that the steering wheel is moved to a stowage position outside the operating position and the vehicle interior becomes available for other use. For conventional, manual driving, the steering column is deployed from the stowage position in the opposite direction.

The longitudinal adjustment can be implemented by a telescopic disposal of casing tubes. In order to achieve an ideally large adjustment ratio between the maximum deployed operating position and to implement an ideally compact short dimension in the stowage position, it is known from DE 10 2015 216326 A1 for at least three casing tubes to be disposed so as to be telescopically displaceable, specifically an outer casing tube or external casing tube, an inner casing tube or internal casing tube, as well as at least one intermediate casing tube which is coaxially inserted therebetween. In order for the stowage position to be adjusted, the three casing tubes can be collapsed, that is to say retracted, so far that the internal casing tube and the intermediate casing tube or tubes in the axial direction are substantially lowered into the external casing tube. The retraction and deployment preferably takes place by means of a motorized adjustment drive which comprises, for example, a spindle drive which is able to be driven by an electric motor and engages on the casing tubes.

In order for the casing tubes to be mutually moved in a defined sequence during retraction and deployment, it is known that two telescopic casing tubes have in each case one locking bolt installation. The latter has a latching device which is disposed between the internal casing tube and an intermediate casing tube and which by latching in the collapsed state forms a releasable latching connection which can be released by overcoming a predefined latching force in the longitudinal direction. As a result of the fact that the latching force required for releasing the latching device is higher than the friction force which has to be overcome when telescoping the casing tubes, the internal casing tube during deployment is initially moved out of the external casing tube conjointly with the intermediate casing tube until the intermediate casing tube is fully deployed and impacts the external casing tube. The latching connection is thereafter released, and the internal casing tube is moved out of the intermediate casing tube.

The sequence of the relative telescopic movement of the casing tubes during deployment can thus be precisely predefined. For retraction, the adjustment force is exerted on the internal casing tube in the opposite longitudinal direction. The latching device released in the deployed state here is inactive such that the sequence in which the casing tubes are collapsed is determined solely by the momentary friction force between in each case two casing tubes. For example, if the friction between the internal casing tube and the intermediate casing tube is greater than between the intermediate casing tube and the external casing tube, the intermediate casing tube first plunges into the external casing tube, and thereafter the internal casing tube plunges into the intermediate casing tube, until the latching device can latch again. However, if the friction between the internal casing tube and the intermediate casing tube is less than between the intermediate casing tube and the external casing tube, a reverse sequence accordingly results. Should the friction forces between the casing tubes however not be different, or in any case not significantly different, the sequence may be unclear, or influenced by external influences such as temperature variations, contaminations or the like, such that no unequivocally defined retraction and deployment of the casing tubes takes place, the latter being disadvantageous.

Thus a need exists for a steering column having an improved locking bolt installation which enables a defined sequence during the relative movement of the casing tubes.

DETAILED DESCRIPTION

Although certain example methods and apparatuses have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art The present disclosure generally relates to a steering column for a motor vehicle. In some examples, a steering column may comprise a casing unit in which a steering spindle is mounted so as to be rotatable about a longitudinal axis and which has at least three telescopically guided casing tubes which are mutually adjustable in the axial direction, of which one forms an external casing tube in which at least one intermediate casing tube is received, an internal casing tube being received in the latter, and comprising a locking bolt installation which is specified for releasably locking at least two of the casing tubes to one another in the direction of the longitudinal axis In a steering column for a motor vehicle mentioned at the outset, comprising a casing unit in which a steering spindle is mounted so as to be rotatable about a longitudinal axis and which has at least three telescopically guided casing tubes which are mutually adjustable in the direction of the longitudinal axis, of which one forms an external casing tube in which at least one intermediate casing tube is received, an internal casing tube being received in the latter, and comprising a locking bolt installation which is specified for releasably locking at least two of the casing tubes to one another in the axial direction, it is provided according to the invention that the locking bolt installation is able to be switched between an internal blocking position and an external blocking position, wherein the intermediate casing tube in the internal blocking position is locked to the internal casing tube, and the intermediate casing tube in the external blocking position is locked to the external casing tube.

The mutually adjustable, telescopically guided casing tubes in one potential variant of embodiment can be embodied in such a manner that the casing tubes in the circumferential direction do not fully engage about one another, for example have an open circumferential region or even have U-shaped or L-shaped cross-sectional profiles which are mutually telescopically guided in the context of the invention. For example, it can be provided that the external casing tube has an L-shaped cross-sectional profile in which a U-shaped intermediate casing tube is received so as to be telescopically guided, and in which a closed internal casing tube in which the steering shaft is rotatably mounted is received so as to be telescopically guided. The external casing tube could also be configured so as to have a U-shaped cross-sectional profile. The intermediate casing tube can also be configured so as to have an L-shaped cross-sectional profile.

In a further potential variant of embodiment, the casing tubes which are telescopically guided in one another can have a closed cross section or form such a cross section.

Rolling members or rollers can be disposed between the telescopically guided casing tubes. As a result, said casing tubes can be mutually mounted in a corresponding manner.

The mutually adjustable, telescopically guided casing tubes can preferably be disposed so as to be mutually concentric and mutually displaceable. The casing tubes can accordingly be mutually guided in one another.

The locking bolt installation being able to be switched means that said locking bolt installation is at all times able to be selectively moved to only one of the two possible blocking positions (internal blocking position or external blocking position), thus the intermediate casing tube is connected either to the internal casing tube or to the external casing tube, that is to say is locked with respect to a relative telescopic movement in the direction of the longitudinal axis. One casing tube being locked to another casing tube means that the relative movement is blocked at least in one direction of the longitudinal axis, thus the casing tubes can at least not be mutually retracted or deployed any further. In other words, the relative movement is blocked at least in one sense of direction.

The locking bolt installation according to the invention is disposed on an intermediate casing tube and by switching can be selectively moved to two different functional states, specifically the internal blocking position, also referred to as the internal locking, or the external blocking position, also referred to as the external locking. The intermediate casing tube in the internal blocking position is connected in the longitudinal direction to the internal casing tube guided in the former and hereby telescopically adjustable in the external casing tube. When switching, the internal blocking position is released and the external blocking position is activated, the intermediate casing tube in the latter being connected with respect to the longitudinal direction to the external casing tube in which said intermediate casing tube is received. The internal casing tube here is adjustable in the intermediate casing tube.

While the latching device known in the prior art can in each case releasably connect only two casing tubes, i.e. the intermediate casing tube and the internal casing tube or the intermediate casing tube and the external casing tube, by passive latching by virtue of the adjustment force exerted, the locking bolt installation according to the invention can block or release the telescopic movement of an intermediate casing tube in relation to the internal casing tube and to the external casing tube in an actively defined manner. This results in the advantage that a defined sequence of the relative movement of the casing tubes can be predefined during retraction as well as during deployment by correspondingly switching the locking bolt installation.

The locking bolt installation according to the invention can be implemented in a casing unit having three casing tubes in which only one intermediate casing tube is disposed between the external casing tube and the internal casing tube. An implementation in a telescopic assembly having four or more casing tubes is likewise possible, said telescopic assembly correspondingly having two or more intermediate casing tubes. In each case here, an outer casing tube which receives an intermediate casing tube forms an external casing tube, and, in an analogous manner, an inner casing tube which is received by the intermediate casing tube forms an internal casing tube in the context of the invention.

An advantageous design embodiment lies in that the internal casing tube has an activation means which is specified for switching the locking bolt installation to the external blocking position, and/or the external casing tube has an activation means which is specified for switching the locking bolt installation to the internal blocking position. It can be provided here that an activation means of the internal casing tube, as a function of a predefined first relative position between the intermediate casing tube and the external casing tube, is specified for switching the locking bolt installation to the external blocking position, and/or an activation means of the external casing tube, as a function of a predefined second relative position between the intermediate casing tube and the external casing tube, is specified for switching the locking bolt installation to the internal blocking position. As a result, an advantageously conditional locking can be made available, the locking bolt installation being switched to one of the two possible locking positions, i.e. the internal blocking position or the external blocking position, under the condition that the casing tubes are mutually situated in a specific adjustment state, i.e. a first or second adjustment state. The blocking or releasing of the relative movement is conditional to the relative position. As a result, the particular advantage can be implemented that a type of mechanical forced or sequential control is realized, by way of which the sequence of the relative movement of in each case one external casing tube, intermediate casing tube and external casing tube is unequivocally defined solely by the relative movement of the casing tubes during deployment or retraction. Even when the adjustment force engages between the innermost internal casing tube and the outermost external casing tube, the switching for the intermediate casing tube or tubes disposed therebetween can take place in a self-acting manner such that a defined sequence can advantageously be predefined and maintained independently of external influences such as friction or the like.

One advantageous embodiment can provide that the locking bolt installation has a locking element which is mounted so as to be movable on the intermediate casing tube and which in the external blocking position is able to be brought to engage with an external locking bolt receptacle configured on the external casing tube, and/or in the internal blocking position is able to be brought to engage with an internal locking bolt receptacle configured on the internal casing tube. The locking element can preferably be mounted on the intermediate casing tube so as to be movable in the radial direction and supported in the longitudinal direction on said intermediate casing tube. The locking element, in a radial position which corresponds to the internal blocking position preferably engages, preferably in a form-fitting manner with respect to the longitudinal direction, from the outside radially in a corresponding radial clearance or opening which is preferably disposed externally on the internal casing tube and forms the internal locking bolt receptacle. As a result, the intermediate casing tube and the internal casing tube are locked to one another, thus connected to one another in the longitudinal direction. The intermediate casing tube, conjointly with the internal casing tube fixed therein by the locking element, is telescopically movable for adjustment in the external casing tube. For switching, the locking element can be moved from this position relative to the intermediate casing tube, preferably in a radially outward manner, until said locking element assumes the other radial position which corresponds to the external blocking position. The locking element here is removed from the internal locking bolt receptacle, and the relative telescopic movement between the intermediate casing tube and the internal casing tube is released. Simultaneously, the locking element here, so as to be directed radially outward, engages, preferably in a form-fitting manner with respect to the longitudinal direction, in a corresponding radial clearance or opening which is preferably disposed on the external casing tube and forms the external locking bolt receptacle. As a result, the external casing tube and the intermediate casing tube are locked to one another, thus connected to one another in the longitudinal direction. The internal casing tube here can be telescopically adjusted relative to the internal casing tube.

As a result of the locking element radially penetrating the intermediate casing tube and being mounted in the latter so as to be radially movable, said locking element for switching can be moved radially inward or outward such that said locking element selectively assumes the internal blocking position or the external blocking position. The locking element can be configured, for example, as an elongate blocking pin or bolt which can be mounted in a locking bolt guide so as to be displaceable in the radial direction through the wall of the intermediate casing tube, for example. Accordingly, the locking element in the external blocking position protrudes toward the outside such that said locking element from the inside can interact with the external blocking bolt receptacle of the surrounding external casing tube, and in the internal blocking position protrudes toward the inside such that said locking element can engage in the internal locking bolt receptacle of the internal casing tube from the outside. An assembly of this type is functionally reliable and can advantageously be implemented with little complexity and compact dimensions. Alternatively, the locking element can be repositionable between the two switched positions in a different manner, for example by a pivoting mounting or tilting mounting or a gate guide.

A locking element configured as a locking pin or bolt can have a cross section which is circular at least in portions. The locking bolt guide here can be implemented in a simple manner as a friction guide by way of a radial bore having a likewise preferable circular cross section.

A plurality of locking elements can preferably be disposed so as to be distributed across the circumference, preferably distributed in a symmetrical manner. As a result, a uniform and reliable transmission of force between the interlocking casing tubes can be implemented. Moreover, the locking function can be designed so as to be redundant with little complexity as a result thereof.

It can be provided that the locking element is configured for interacting with an (outer) activation means disposed on the external casing tube in such a manner that a relative movement between the intermediate casing tube and the external casing tube is converted to a movement of the locking element to the internal blocking position, and/or for interacting with an (inner) activation means disposed on the internal casing tube in such a manner that a relative movement between the intermediate casing tube and the external casing tube is converted to a movement of the locking element for switching to the external blocking position.

The locking element when interacting with in each case one activation means thus preferably forms an angle gear which converts in each case one relative movement of the casing tubes in the longitudinal direction to a switching movement of the locking element between the internal blocking position and the external blocking position or vice versa.

This switching movement is preferably directed transversely to the longitudinal direction. This can specifically be achieved in that the locking element when reaching a predefined relative adjustment position in each case mechanically contacts the activation means and is switched by the adjustment force exerted on the casing tubes in the longitudinal direction. As a result, a self-acting switching of the locking bolt installation when retracting and deploying the casing unit can take place in the context of the conditional locking described above.

An angle gear for implementing the afore-mentioned switching can be implemented with little complexity, in a space-saving and functionally reliable manner in that the locking element has an internal head which is able to be introduced from the outside into the internal locking bolt receptacle, and an external head which is able to be introduced from the inside into the external locking bolt receptacle. An internal head or external head, respectively, is in each case disposed so as to be radially inside or outside, respectively, on a locking element which is pin-shaped or bolt-shaped, for example, preferably so as to be configured integrally with said locking element. The internal locking head or external locking head in the respective internal blocking position or external blocking position serves as a blocking element, preferably as a form-fit element which engages in a form-fitting manner in the corresponding internal locking bolt receptacle or external locking bolt receptacle and which when engaged generates a form-fit which acts in the longitudinal direction between the intermediate casing tube and the internal casing tube or external casing tube. As a result, the locking forms a reliable and load-bearing connection.

In the afore-mentioned embodiment it can preferably be provided that the internal head and/or the external head have/has an activation ramp which interacts in each case with a corresponding activation element configured on the internal casing tube or on the external casing tube. The activation ramp which is in each case configured on the external head or internal head is inclined toward the longitudinal axis, preferably at an angle of 30° to 60°, and, when viewed from the locking element, forms a wedge that tapers off toward the intermediate casing tube. The internal head and the external head can preferably in each case have a circular cross section, wherein the activation ramp is formed by an encircling conical shell. One activation ramp and one activation element conjointly form an angle gear configured as a wedge gear for converting a relative movement of the casing tubes in the longitudinal direction to a radial switching movement of the locking element. To this end, the outer activation element disposed on the external casing tube is configured such that said outer activation element in the external blocking position contacts the activation ramp on the external head when the intermediate casing tube is retracted into the external casing tube and reaches a pre-defined adjustment position which further above is referred to as the second relative position. During further retraction, the radially stationary activation element slides across the activation ramp whereby the locking element as a result of the wedge effect is moved radially inward and is switched from the external blocking position to the internal blocking position. The locking element can be moved from the internal blocking position to the external blocking position by an inner activation element of identical type on the internal casing tube that interacts with an activation ramp on the internal head.

Alternatively, it can be provided that the locking element at the free ends thereof has a roller which is mounted so as to be rotatable on the locking element and is able to be brought to engage with the respective locking bolt receptacle. As a result, a friction force acting in the switching procedure can be reduced.

The locking element can preferably be from a plastics material or a metallic material such as steel, aluminum, zamac, brass or bronze. In one advantageous refinement, the locking element can be at least partially coated with a lubricant varnish.

In order to ensure a reliable, defined and friction-independent transmission of the adjustment force to the previously described angle gear composed of the activation element and the activation ramp, or else any other potential form of an angle gear or activation gear, in a relative movement of two casing tubes, it is advantageous for the internal casing tube and/or the external casing tube and the intermediate casing tube to have corresponding longitudinal detents which can be brought to impact one another in the longitudinal direction. For example, the intermediate casing tube can have an axial detent face as a longitudinal detent at the one end from which the internal casing tube can be deployed. The internal casing tube has a longitudinal detent having an opposite axial detent face. When the internal casing tube is retracted, the latter impacts the mentioned detent face of the intermediate casing tube, the latter as a result of the adjustment force applied to the internal casing tube being entrained in the longitudinal direction. As a result, the intermediate casing tube conjointly with the internal casing tube retracted therein is retracted into the external casing tube until the activation ramp of the external head contacts the activation element of the external casing tube, as has been described above. The locking element in this adjustment position is switched to the internal blocking position and engages in the internal locking bolt receptacle of the internal casing tube.

It is possible for one activation ramp and one corresponding activation element to be provided in order for the locking element to be moved only in one activation direction, from the external blocking position to the internal blocking position or vice versa. In order for the locking element to be moved counter to the activation direction, thus from the internal blocking position back to the external blocking position or vice versa, it can be advantageous for the locking element to be spring-loaded in the external blocking position or the internal blocking position.

The spring load can be provided by an elastically deformable spring element which can have, for example, a helical spring, a plate spring, or a rubber element.

As a result of the locking element being elastically preloaded in the external blocking position, for example, preferably by means of a spring element supported on the intermediate casing tube, the previously described movement by the activation element takes place counter to the preload, that is to say counter to the elastic spring force. As long as the intermediate casing tube together with the locking bolt installation is situated in the retracted stowage position within the external casing tube, the locking element by way of the preload is externally supported in relation to the internal wall of the external casing tube such that said locking element cannot be moved out of the internal blocking position by the spring force. However, as soon as the locking element passes through the opening of the external casing tube when the intermediate casing tube is deployed in a telescopic manner, said locking element in a self-acting manner is moved from the internal blocking position to the external blocking position by the spring force. As a result, the internal casing tube is unlocked and can be deployed from the intermediate casing tube. The spring element here likewise forms an activation means which, once a predefined adjustment position is reached, can cause self-acting switching of the locking bolt installation when retracting and deploying the casing unit.

The casing tubes can furthermore have extraction safeguards known per se, the latter preventing that an inner casing tube can be fully extracted from an outer casing tube in which the former is received and guided, the casing tube thereby being separated. The known extraction safeguards on an inner casing tube, at the plunging end thereof, have outwardly projecting axial detents, and counter-detents which project inwardly on the outer casing tube and can be brought to axially impact said inner casing tube in the longitudinal direction.

Figure 1:
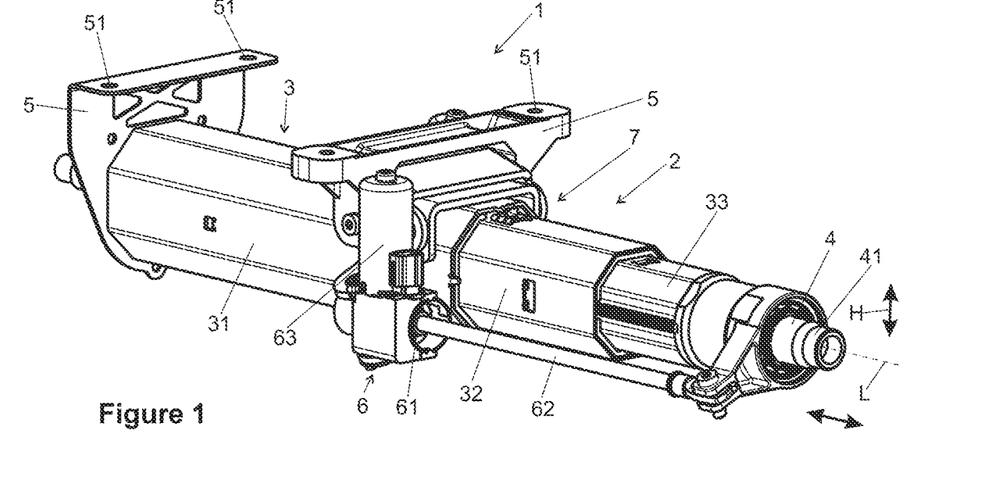
FIG. 1 is a schematic perspective view of an example steering column.
Figure 2:
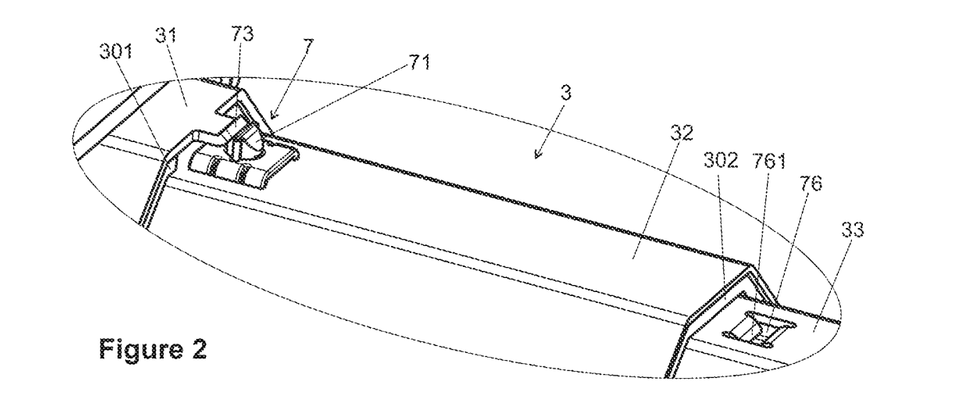
FIG. 2 is an enlarged detail view of the steering column from FIG. 1 in a region of a locking bolt installation.
Figure 3:
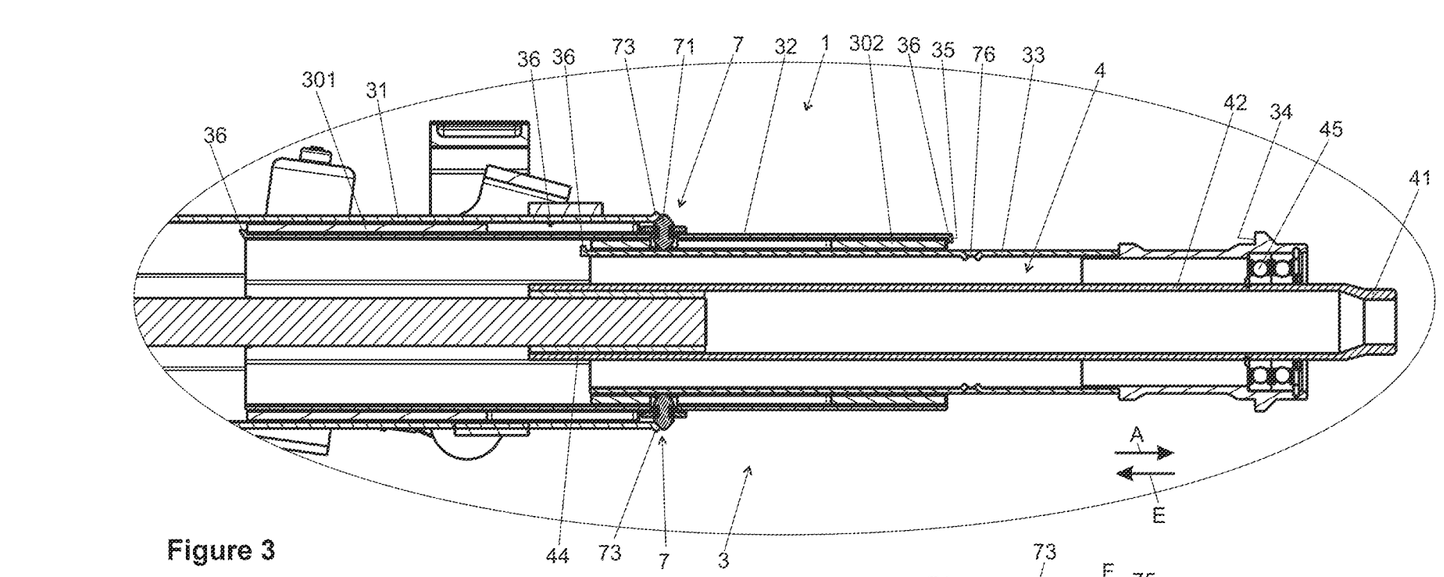
FIG. 3 is a longitudinal sectional view along a longitudinal axis through the steering column according to FIG. 1 in a stowage position where the steering column is in a retracted or collapsed state.
Figure 4:
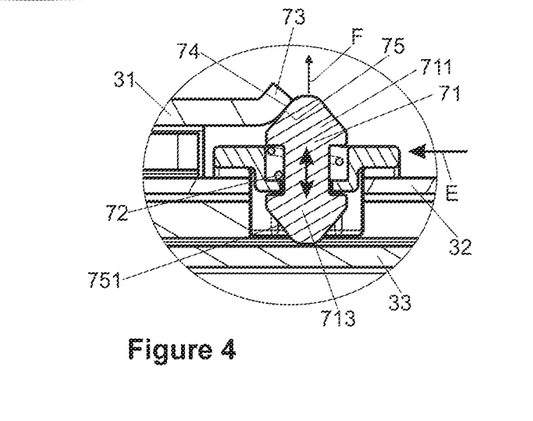
FIG. 4 is an enlarged detail view of the steering column in FIG. 3 in a region of the locking bolt installation.
Figure 5:
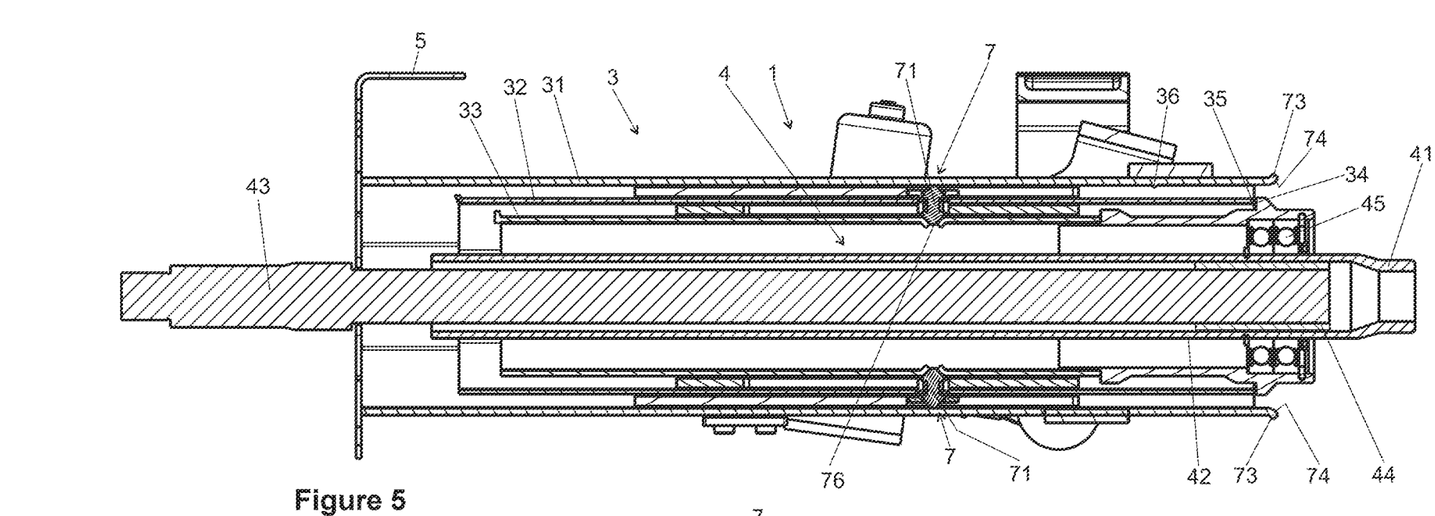
FIG. 5 is a longitudinal sectional view along a longitudinal axis through the steering column according to FIG. 1 in an operating position where the steering column is in a deployed state.
Figure 6:
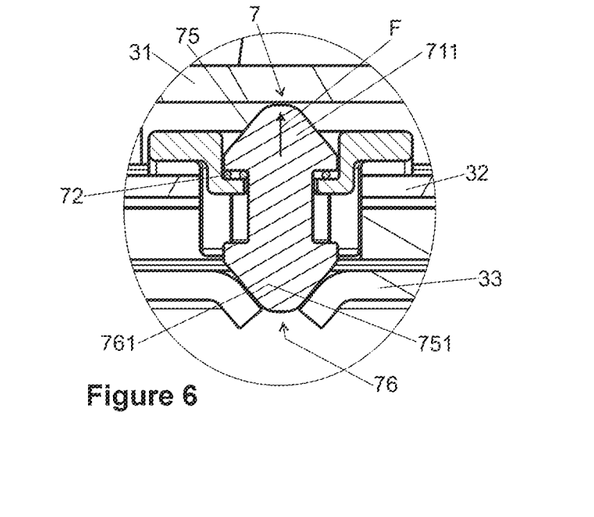
FIG. 6 is an enlarged detail view of the steering column in FIG. 5 in a region of the locking bolt installation.

A combination of activation means which have at least one angle gear which interacts with a locking element in the manner described above, and at least one spring element which likewise interacts with the locking element, can preferably be provided FIG. 1 shows a steering column 1 according to the invention in a perspective view from obliquely behind, with respect to the direction of travel, in FIG. 3 in a longitudinal section in the stowage position in the maximum retracted or collapsed state, respectively, and in FIG. 5 in the same sectional view as in FIG. 3 in a possible operating or operative position, respectively, in a deployed state. FIGS. 2, 4 and 6 show enlarged partial views of FIGS. 1, 3 and 5.

The steering column 1 has an actuator unit 2. The actuator unit 2 comprises a casing unit 3 having three casing tubes 31, 32, 33, specifically an external casing tube 31, an intermediate casing tube 32, and an internal casing tube 33. The casing tubes 31, 32 and 33 are disposed so as to be coaxial inside one another, and are telescopically displaceable in the longitudinal direction, the latter corresponding to the axial direction of a longitudinal axis L, as is indicated by the double arrow. The one direction in which the casing tubes 31, 32, 33 can be conjointly moved into one another, i.e. retracted, to the stowage position in order for the actuator unit 2 to be shortened, is the retraction direction E, and correspondingly the direction counter thereto, in which the casing tubes 31, 32, 33 are moved apart, i.e. deployed, from the stowage position in the direction of an operating position is the deployment direction A, as is indicated by the respective arrows.

A steering spindle 4 which at the rear end thereof has a connector portion 41 for attaching a steering wheel, not illustrated, is mounted in the casing unit 3 so as to be rotatable about a longitudinal axis L. The steering spindle 4 is likewise configured so as to be telescopic in the axial direction, having an external shaft 42 configured as a hollow shaft into which an internal shaft 43 plunges so as to be telescopically displaceable in the axial direction. The internal shaft 43 and the external shaft 42 are connected to one another in a torque-fitting manner by way of a longitudinally displaceable coupling 44, the latter in a manner known per se, by way of non-round cross sections, longitudinal toothings or the like, generating a rotationally fixed connection which is displaceable in the axial direction. The external shaft 42 in the internal casing tube 33 is mounted in a bearing 45 which preferably has roller bearings. The internal shaft 43 can be rotatably mounted in the external casing tube. The internal shaft 43 can preferably be able to be connected to a shaft of a feedback actuator. Alternatively, the internal shaft 43 can also be able to be coupled to a steering layshaft which in turn is coupled in a torque-fitting manner to an input shaft of a steering gear, wherein the steering layshaft preferably comprises at least one universal joint.

The casing unit 3 is held in a two-part support unit 5 which has fastening means 51 for attaching to a vehicle body which is not illustrated.

An adjustment drive 6 has a spindle drive having a spindle nut 61 and a threaded spindle 62 which is screwed into the latter, said spindle nut 61 and said threaded spindle 62 being able to be rotationally driven relative to one another by an electric motor 63. The threaded spindle 62 extends parallel to the longitudinal axis L and is connected to the internal casing tube 33, and the spindle nut 61 by way of the adjustment drive 6 is supported in the longitudinal direction on the external casing tube 31, said longitudinal direction corresponding to the axial direction of the longitudinal axis L. Depending on the direction of rotation, the threaded spindle 62 and the spindle nut 61 are moved so as to converge or diverge as a result of a relative rotation by means of the motor 63, as a result of which the internal casing tube 33 in the axial direction can either be retracted in the retraction direction E into the external casing tube 31, or counter thereto be deployed in the deployment direction A from the external casing tube 31. As a result, a longitudinal adjustment is implemented as a result of which a steering wheel attached to the connector portion 41 can be selectively brought forward to the stowage position illustrated in FIG. 5, in which the internal casing tube 33 and the intermediate casing tube 32 are retracted into the external casing tube 31, i.e. are lowered forward into the latter, or be brought rearward to an operating position illustrated in FIG. 1 or FIG. 3, in which the casing tubes 31, 32, and 33 are deployed from one another. A first friction sleeve 301 can optionally be disposed between the external casing tube 31 and the intermediate casing tube 32, and an optional second friction sleeve 302 can be disposed between the intermediate casing tube 32 and the internal casing tube 33. The friction sleeves 301, 302 can have clearances or grooves, the locking pin 71 of the locking bolt installation 7 extending through said clearances or grooves. The friction sleeves 301, 302 are preferably formed from a plastics material.

Alternatively, the spindle nut 61 can be supported on the internal casing tube 33, and the threaded spindle 62 can be supported on the external casing tube 31.

An operating position of the steering column 1 in which the intermediate casing tube 32 and the internal casing tube 33 are at least partially moved out of the external casing tube 31 in the deployment direction A, to the right in the drawing, such that a steering wheel that is able to be attached to the connector portion 41 is situated in the operating region for inputting steering commands, is shown in FIG. 3. FIG. 5 in the same sectional view shows the stowage position in which the intermediate casing tube 32 and the internal casing tube 33 are pushed to the maximum in the retraction direction E into the external casing tube 31. As a result, the steering wheel 1 is shortened to the maximum in the axial direction such that the steering wheel, for example in the autonomous driving operation or so as to facilitate ingress and egress in the case of a parked vehicle, can be stowed outside the operating region.

A locking bolt installation 7 according to the invention comprises a locking element configured as a locking pin 71 which in the intermediate casing tube 32 is mounted so as to be movable transversely to the longitudinal axis L, i.e. in the radial direction, and so as to be supported in the axial direction of the longitudinal axis L. The locking pin 71, while sliding in a guide opening, penetrates the wall of the intermediate casing tube 32, and has an outwardly projecting external head 711 and an inwardly projecting internal head 713, the latter having an inclined control face 751. As a result of a spring element 72, for example a coil spring, which is externally supported in relation to the intermediate casing tube 32 and engages on the locking pin 71, the locking pin 71 with respect to the longitudinal axis L is elastically preloaded in a radially outward manner by a spring force F, as is indicated in FIGS. 4 and 6.

The locking pin 71 in an external blocking position as is illustrated in FIGS. 2, 3 and 4, with respect to the intermediate casing tube 32 is displaced in a radially outward manner. The external head 711 here protrudes so far outward that said external head 711 interacts with an external locking bolt receptacle 73 configured on the external casing tube 31. The external locking bolt receptacle 73 has an inclined axial face 74 which represents an activation means in the context of the invention. The external head 711 has an activation ramp 75 which in the example shown is inclined downward at an angle of approximately 45° in the retraction direction E toward the longitudinal axis L.

In the external blocking position, the intermediate casing tube 32 is locked by way of the external locking bolt receptacle 73 to the external casing tube 31 in such a manner that said intermediate casing tube 32 cannot be retracted in the retraction direction E into the external casing tube 31, whereby a further deployment in the deployment direction A of the intermediate casing tube 32 from the external casing tube 31 is possible. The internal casing tube 33 here can be moved in a telescopic manner without impediment in the intermediate casing tube 32.

The internal casing tube 33 has an internal locking bolt receptacle 76 in the form of a wedge-shaped opening in which the locking pin 71 in the internal blocking position illustrated in FIG. 6, in which said locking pin 71 with respect to the intermediate casing tube 32 is repositioned in a radially inward manner, engages by way of the internal head 713 of said locking pin 71. As a result, a form-fitting connection effective in the axial direction is generated, the internal casing tube 33 being locked to the intermediate casing tube 32 in the axial direction (longitudinal direction) by said form-fitting connection.

In the internal blocking position, the intermediate casing tube 32 is locked by way of the internal locking bolt receptacle 73 to the internal casing tube 33 in such a manner that said intermediate casing tube 32 cannot be moved in a mutually relative manner either in the retraction direction E or in the deployment direction A. The intermediate casing tube 32, conjointly with the internal casing tube 33 locked to the former, here can be moved in a telescopic manner without impediment in the external casing tube 31.

As a result of the locking pin 71 being able to be moved to the external blocking position or internal blocking position, switching of the locking bolt installation 7 according to the invention can be effected, said switching ensuring a defined sequence when telescopically retracting or deploying the casing tubes 31, 32, 33, as will be explained hereunder.

In order for the steering column 1 to be brought from the deployed operating position illustrated in FIG. 3, for example during autonomous driving, to the stowage position shown in FIG. 5, an adjustment force in the retraction direction E is exerted on the internal casing tube 33 by the adjustment drive 6. The locking bolt installation 7 which is situated in the external blocking position, by way of the external head 711 of the locking pin 71 that in a form-fitting manner lies against the external locking bolt receptacle 73, here prevents that the intermediate casing tube 32 can be retracted into the external casing tube 31. The locking pin 71 here, by way of the internal head 713 thereof, is supported from the outside in relation to the internal casing tube 33 in such a manner that said locking pin 71 cannot exit the external blocking position. Therefore, only the internal casing tube 33 can initially be retracted into the intermediate casing tube 32.

When the internal casing tube 33 has been fully retracted into the intermediate casing tube, the locking pin 71 and the internal locking bolt receptacle 76 are situated at the same position. As a result of a longitudinal detent 34, the latter being disposed on the internal casing tube 33 and having an axial detent face which in the retraction direction E is directed toward the intermediate casing tube 32, impacting an axially opposite detent face of a corresponding longitudinal detent 35 on the intermediate casing tube 32, the adjustment force of the adjustment drive 6 is effective between the activation ramp 75 of the external head 701 and the axial face 74 of the external locking bolt receptacle 73 that lies against said activation ramp 75. The switching of the locking bolt installation 7 is effected in that the activation ramp 75 and the axial face 74 form a cam mechanism. The adjustment force acting in the axial direction is deflected by this cam mechanism and transmitted in the radial direction to the locking pin 71 in such a manner that the latter counter to the spring force F is moved radially inward from the external blocking position until said locking pin 71 assumes the internal blocking position illustrated in FIG. 6. The internal head 713, which moves inward, plunges here in a form-fitting manner into the internal locking bolt receptacle 76.

As a result of the self-acting switching described, the internal casing tube 33 is now locked to the intermediate casing tube 32, and the locking between the intermediate casing tube 32 and the external casing tube 31 is simultaneously released. Consequently, the intermediate casing tube 32, conjointly with the internal casing tube 33 situated therein, as a result of the adjustment force exerted in the retraction direction E is retracted into the external casing tube 31 until the terminal position illustrated in FIG. 5, thus the stowage position, is reached.

The sequence in which the casing tubes 31, 32, 33 are mutually moved is unequivocally established as a result of the conditional locking, such that non-defined adjustment states can be reliably avoided.

In order for the steering column 1 to be brought from the stowage position to the operating position, an adjustment force in the deployment direction A is exerted on the internal casing tube 33 by the adjustment drive 6 in FIG. 5. Thereafter, only the intermediate casing tube 32 that is locked to the internal casing tube 33 can initially be moved out of the external casing tube 31. Once the locking pin 71 reaches the position shown in FIG. 3, said locking pin 71 as a result of the spring force F of the spring element 72 is moved in a self-acting manner from the internal blocking position to the external blocking position according to FIG. 4 such that the locking bolt installation 7 is switched. It is only then that the internal casing tube 33 can be deployed from the intermediate casing tube 32. Alternatively, the spring element 72 can also be omitted. As a result of an inclined control face 761 of the internal locking bolt receptacle 76, the locking pin 71 which by way of the counter-control face 751 configured on the internal head 713 interacts with the control face and provides a can mechanism, is transferred from the internal blocking position to the external blocking position when the movement of the locking pin 71 is no longer prevented by the external casing 31 and said locking pin 71 can engage in the external locking bolt receptacles. In other words, as a result of the inclined control face and counter-control face, the force acting in the direction of the longitudinal axis is converted to a lifting movement of the locking pin 71.

Two or more locking bolt installations 7 are preferably disposed so as to be distributed across the circumference, as is illustrated.

The casing tubes 31, 32, 33 preferably have extraction safeguards 36 which comprise axial detents that project radially on the outside of an inner casing tube 32, 33 and interact with axial detents that project radially inward on the corresponding outer casing tubes 31, 32 in such a manner that said axial detents impact one another in the event of a predefined extraction, thus preventing that the casing tubes 31, 32, 33 are excessively extracted or separated, whereby the extraction safeguards in an impact situation are supported on the friction sleeves 301, 302.

LIST OF REFERENCE SIGNS

1 Steering column
2 Actuator unit
3 Casing unit
31 External casing tube
311 Raceway
32 Intermediate casing tube
321 Raceway
33 Internal casing tube
34, 35 Longitudinal detent
36 Extraction safeguards
4 Steering spindle
41 Connector portion
42 External shaft
43 Internal shaft
44 Coupling
45 Bearing
5 Support unit
51 Fastening means
6 Adjustment drive
61 Spindle nut
62 Threaded spindle
63 Motor
7 Locking bolt installation
71 Locking pin
711 External head
713 Internal head
72 Spring element
73 External locking bolt receptacle
74 Axial face (activation means)
75 Activation ramp
76 Internal locking bolt receptacle
L Longitudinal axis
E Retraction direction
A Deployment direction
F Spring force

What is claimed is:

1. A steering column for a motor vehicle comprising:
a casing unit in which a steering spindle is mounted so as to be rotatable about a longitudinal axis, the casing unit having at least three telescopically guided casing tubes that are mutually adjustable in an axial direction, wherein one of the at least three telescopically guided casing tubes is an external casing tube in which an intermediate casing tube is received, wherein an internal casing tube is received in the intermediate casing tube; and
a locking bolt installation for releasably locking at least two of the at least three telescopically guided casing tubes to one another in a direction of the longitudinal axis, wherein the locking bolt installation is switchable between an internal blocking position and an external blocking position, wherein in the internal blocking position the intermediate casing tube is locked to the internal casing tube, wherein in the external blocking position the intermediate casing tube is locked to the external casing tube.

2. The steering column of claim 1 wherein at least one of:
the internal casing tube has an activation means for switching the locking bolt installation to the external blocking position; or
the external casing tube has an activation means for switching the locking bolt installation to the internal blocking position.

3. The steering column of claim 2 wherein at least one of:
the activation means of the internal casing tube, as a function of a predefined first relative position of the intermediate casing tube and the external casing tube, is configured to switch the locking bolt installation to the external blocking position; or
the activation means of the external casing tube, as a function of a predefined second relative position of the intermediate casing tube and the external casing tube, is configured to switch the locking bolt installation to the internal blocking position.

4. The steering column of claim 1 wherein the locking bolt installation includes a locking element that is mounted so as to be movable on the intermediate casing tube, wherein the locking element is at least one of:
engageable with an external locking bolt receptacle on the external casing tube in the external blocking position; or
engageable with an internal locking bolt receptacle on the internal casing tube in the internal blocking position.

5. The steering column of claim 4 wherein the locking element radially penetrates the intermediate casing tube and is mounted in the intermediate casing tube so as to be radially movable.

6. The steering column of claim 4 wherein the locking element is configured to interact with at least one of:
an activation means disposed on the external casing tube such that a relative movement between the intermediate casing tube and the external casing tube causes the locking element to move to the internal blocking position; or
an activation means disposed on the internal casing tube such that a relative movement between the intermediate casing tube and the external casing tube causes the locking element to switch to the external blocking position.

7. The steering column of claim 4 wherein the locking element comprises:
an internal head configured to be disposed from an outside into the internal locking bolt receptacle; and
an external head configured to be disposed from an inside into the external locking bolt receptacle.

8. The steering column of claim 7 wherein the internal head and/or the external head has an activation ramp that interacts with a corresponding activation element configured on the internal casing tube or the external casing tube.

9. The steering column of claim 4 wherein the intermediate casing tube and at least one of the internal casing tube or the external casing tube have corresponding longitudinal detents that can impact one another in the direction of the longitudinal axis.

10. The steering column of claim 4 wherein the locking element is spring-loaded in the external blocking position or the internal blocking position.

* * * * *